United States Patent [19]
Hopkins

[11] Patent Number: 5,926,283
[45] Date of Patent: Jul. 20, 1999

[54] MULTI-SPECTRAL TWO DIMENSIONAL IMAGING SPECTROMETER

[75] Inventor: Mark F. Hopkins, Tucson, Ariz.

[73] Assignee: Optical Insights, LLC, Tucson, Ariz.

[21] Appl. No.: 09/112,538

[22] Filed: Jul. 9, 1998

Related U.S. Application Data

[60] Provisional application No. 60/053,266, Jul. 12, 1997.

[51] Int. Cl.⁶ ................................................. G01J 3/26
[52] U.S. Cl. ........................................ 356/419; 250/226
[58] Field of Search .................................. 356/326, 328, 356/419; 250/226

[56] References Cited

U.S. PATENT DOCUMENTS

| | | | |
|---|---|---|---|
| 3,720,146 | 3/1973 | Yost, Jr. . | |
| 4,072,405 | 2/1978 | Ozeki . | |
| 4,084,180 | 4/1978 | Stoffels et al. . | |
| 4,134,683 | 1/1979 | Goetz et al. | 356/407 |
| 4,141,625 | 2/1979 | Pickar et al. . | |
| 4,268,119 | 5/1981 | Hartmann . | |
| 4,272,684 | 6/1981 | Seachman . | |
| 4,281,339 | 7/1981 | Morishita et al. . | |
| 4,531,054 | 7/1985 | Suzuki | 250/201 |
| 4,573,195 | 2/1986 | De France . | |
| 4,650,321 | 3/1987 | Thompson | 356/73 |
| 4,743,112 | 5/1988 | Burke | 356/326 |
| 4,746,798 | 5/1988 | Amon et al. | 250/339 |
| 4,786,813 | 11/1988 | Svanberg et al. | 250/461.1 |
| 4,916,529 | 4/1990 | Yamamoto et al. . | |
| 4,933,751 | 6/1990 | Shinonaga et al. . | |
| 5,024,530 | 6/1991 | Mende | 356/402 |
| 5,059,026 | 10/1991 | Zoechbauer | 356/346 |
| 5,149,959 | 9/1992 | Collins et al. | 250/226 |
| 5,153,621 | 10/1992 | Vogeley | 353/30 |
| 5,194,959 | 3/1993 | Kaneko et al. | 358/225 |
| 5,216,484 | 6/1993 | Chao et al. | 356/326 |
| 5,225,888 | 7/1993 | Selwyn et al. | 356/346 |
| 5,225,893 | 7/1993 | Whitney et al. | 356/407 |
| 5,251,008 | 10/1993 | Masutani | 356/346 |
| 5,260,767 | 11/1993 | Cook | 356/326 |
| 5,276,321 | 1/1994 | Chang et al. | 250/226 |
| 5,414,458 | 5/1995 | Harris et al. | 348/92 |
| 5,461,477 | 10/1995 | Marineeli et al. | 356/352 |
| 5,479,015 | 12/1995 | Rudman et al. | 250/332 |
| 5,526,119 | 6/1996 | Blit et al. | 356/402 |
| 5,539,483 | 7/1996 | Nalwa | 353/94 |
| 5,561,521 | 10/1996 | Chase et al. | 356/346 |
| 5,587,784 | 12/1996 | Pines et al. | 356/4.01 |
| 5,642,191 | 6/1997 | Mende | 356/326 |
| 5,729,011 | 3/1998 | Sekiguchi | 356/419 |

*Primary Examiner*—F. L. Evans
*Attorney, Agent, or Firm*—Antonio R. Durando

[57] ABSTRACT

A multi-spectral two-dimensional imaging spectrometer includes a combination of single or multi-element, achromatic, well-corrected lenses for imaging a two-dimensional scene on an internal field stop. The light emanating from this intermediate image is collimated with another multi-element, achromatic, well-corrected lens. A spectral separation subassembly that divides the incident light into multiple, identical, and independent arms is placed in the collimated space following the collimating lens. The light in each arm is spectrally filtered based on the properties of an interference filter in each arm. An imaging subassembly composed of a single multi-element, achromatic, well-corrected lens system forms contiguous images onto a single two-dimensional detector array. The images are identical copies of the original object with each copy having a different spectral component and can be viewed on a standard monitor or alternatively on a computer employing an analog-to-digital conversion device.

22 Claims, 5 Drawing Sheets

MULTI-SPECTRAL TWO DIMENSIONAL IMAGING SPECTROMETER

RELATED APPLICATIONS

This application is based upon U.S. Provisional Application No. 60/053,266, filed Jul. 12, 1997.

BACKGROUND OF THE INVENTION

1. Field of the Invention

This invention pertains broadly to the area of spectroscopic systems and imaging spectrometry where multiple images of an object are formed corresponding to different spectral components of the object. More specifically, the invention relates to a novel imaging spectrometer designed to acquire simultaneous, spectrally-discrete, two-dimensional images in real time while maintaining the spatial integrity of the image without scanning mechanisms or mathematically intensive reconstruction/registration algorithms.

2. Description of the Related Art

Spectroscopic systems are optical systems that allow for the determination of the spectral (wavelength) composition of objects and scenes. Generally, these systems collect the total energy coming from the object. The wavelengths that comprise the collected energy are separated with the use of a dispersive element employing refractive means such as a prism or diffractive means such as a grating. After passing through one of these dispersive elements, the different wavelength components of the wavefront propagate in different directions and their intensities are recorded by a one-dimensional array of detector pixels.

Fairly complicated spectroscopic systems have been developed in the prior art. For example, U.S. Pat. Nos. 5,149,959 and 5,276,321 describe multichannel systems which can detect the wavelength composition of objects from the visible to the infrared. However, these systems are limited by their inability to record the spectral data without losing spatial information.

Other spectroscopic systems exist that employ interferometric methods for determining the spectral content of an object or scene. The most notable systems are the Fourier transform spectrometer (U.S. Pat. Nos. 5,251,008 and 5,561,521) and the Fabry-Perot spectrometer (U.S. Pat. Nos. 5,461,477, 5,225,893, and 5,059,026). The Fourier transform spectrometer is a Twyman-Green interferometer, which can ascertain the spectral content of a point source. A positive lens collimates the light from the point source before it enters the interferometer. Either the test arm or reference arm mirror is scanned along the optical axis with the intensity being detected at each scan position. Taking the inverse Fourier transform of the envelope of the detected signal yields the spectral intensity of the object as a function of frequency or wavelength.

The Fabry-Perot system is also an interferometric system employing two highly reflective mirrors to form an optical cavity that functions as a spectral filter. Collimated light entering the system undergoes multiple reflections within the optical cavity. Only the particular wavelength for which all the multiple reflections interfere constructively pass through the optical cavity and is recorded by a detector. The particular wavelength that is passed by the optical filter depends on the distance between the two highly reflective mirrors. As this distance is changed, the wavelength passed by the filter also changes. Thus, the bandpass of the Fabry-Perot system is a function of the lateral separation of the mirrors. Therefore, as one mirror is scanned along the optical axis, effectively changing the distance between the mirrors, the bandpass is changed and the different spectral components of the source are recorded sequentially by the detector.

While standard spectrometers are excellent devices for determining the spectral composition of light emanating from an object, they are unable to maintain the spatial integrity of the object in any dimension. Typically, they just collect the total energy of the object and are not capable of determining its spectral content on a pixel by pixel basis. Thus, several systems have been developed to deal with this problem.

The first subset of imaging spectrometers is the one-dimensional scanning system. The standard representative of this category includes an imaging component that forms the image of an object onto a slit aperture. The slit aperture serves to allow a one dimensional cross-section of the two dimensional image to pass through the rest of the optical system. The light emanating from this one-dimensional line image is usually collimated by a lens before it strikes a dispersive element such as a grating or prism. The dispersive element is arranged such that the dispersion of the light is in a direction perpendicular to the line image. The dispersed light is then imaged onto a two-dimensional detector array with another lens such that the detector records one spatial dimension and a spectral dimension.

U.S. Pat. Nos. 4,743,112 and 5,260,767 disclose elaborate examples of this type of system. While the approach is a definite improvement over the basic spectrometer, it still requires scanning of the slit aperture in order to obtain spectral information of a two-dimensional image. Any scanning operation precludes the simultaneous recording of the information which is necessary in many applications.

One-D scanning imaging spectrometers need to scan a spatial dimension in order to record spectral information of a two-dimensional image. Similarly, 2-D scanning systems record information for two spatial dimensions and have to scan in order to acquire spectral information. The Fourier transform (FTS) and Fabry-Perot interferometers discussed above are capable of performing imaging spectrometry and determining the spectral composition of an object on a pixel by pixel basis. However, there are certain limitations imposed by the geometry of these systems. In both cases, the system field of view is severely restricted. For the Fourier transform interferometer, the length of the system, combined with the small size of the mirrors, restricts the f-number and the field of view because optical rays will not propagate through the system for large angles. Therefore, the number of pixels that can be used is limited. Another problem arises with respect to image registration. Two-dimensional images are acquired as one of the mirrors is scanned. Problems associated with scanning, such as mirror jitter, uneven scanning, or mirror walking, create registration problems between the images in the different spectral bands. Finally, the FTS is computationally intensive requiring N Fourier transforms to reconstruct the spectral signature on a pixel by pixel basis for a detector with N pixels. These operations are very time consuming.

The Fabry-Perot interferometer is also limited to a small field of view because of two main effects. First, the light coming from the source undergoes multiple reflections within the mirrored optical cavity before emerging from the system. When the incident light comes from an off-axis point on the object, it enters the cavity at an incident angle other than zero. Consequently, as the light undergoes multiple reflections, it will walk along the mirrors and eventually leak out of the cavity. The result is that the energy throughput of the system decreases as the field increases. The second problem with the Fabry-Perot system is that bandpass varies with field. Since the effective mirror separation changes with field angle, so does the filter bandpass. To minimize the spectral variation from the center to the edge of the field, the field of view has to be small. However, this limits the number of pixels that can be obtained. Moreover, since scanning is necessary, two-dimensional spectral images also cannot be obtained simultaneously.

In addition to these problems of image registration and simultaneity, systems that employ scanning to acquire the spectral composition of an object have difficulty maintaining a high signal-to-noise ratio. This is not only a problem for the Fourier transform and Fabry-Perot interferometers, but also for electrically scanned systems such as liquid crystal systems and acousto-optic tunable filter-based imaging spectrometers (for example, U.S. Pat. No. 5,216,484), which have the additional problem of relatively low transmission. The need for scanning can be avoided by using tomographic-based methods for imaging spectrometry tasks. However, this technique is computationally intensive, requiring the determination, mathematically, of a system matrix that is usually application specific. Thus, since the system matrices need to be reasonably small for computational reasons, tomographic techniques are not capable of providing high spatial resolution.

The 2-D scanning imaging spectrometers discussed above tend to be used for hyperspectral imaging where a large number of spectral bands are necessary (i.e., high spectral resolution). In many applications, however, only a few spectral bands are needed. U.S. Pat. No. 4,134,683, for example, discusses the use of multiple channels where each channel consists of a lens system, a spectral filter and a detector array. Each channel is aimed at the same object. This approach has the crucial disadvantage that the components within each channel have to be properly aligned such that corresponding pixels on each detector are mapped to the same point on the object. With multiple optical systems, it is very difficult to achieve this alignment because of separate tilt, decenter, and boresight errors. In addition, each lens system will have different imaging properties because of differing aberrations from lens to lens causing each of the images to differ.

A second approach (used in U.S. Pat. Nos. 4,268,119, 4,084,180, 4,072,405 and 4,916,529) uses a single optical system in conjunction with a multiple prism assembly. The prism assembly is used to split the incident light into separate beams propagating in different directions. Each beam path has a different spectral filter before the detector array to achieve multispectral imaging. Cube beamsplitters can be used instead of prism assemblies (U.S. Pat. No. 5,414,458). The prism/beamsplitter approach also has some serious drawbacks, though. If the incident beam is not perfectly collimated when it enters the prism assembly, the prism system will introduce a number of aberrations reducing resolution and degrading imagery. Even if the beam is collimated, spectral dispersion caused by the prism will reduce resolution and lead to image registration problems. Finally, due to total internal reflection, using prism assemblies in transmission does not allow the use of the optical system at low f-numbers or large fields of view.

A third approach utilizes a series of dichroic beamsplitters to send the incident light propagating in different directions (U.S. Pat. Nos. 4,281,339 and 4,531,054). The dichroic beamsplitter has an advantage over the prism assembly in that it not only splits the incident light but it does so in a spectrally selective manner without introducing aberrations or significant spectral dispersion. That is, it splits the incident beam by passing one set of wavelengths and reflecting another. Using a set of dichroic beamsplitters and multiple detectors, a multispectral imaging system can be assembled.

These approaches allow for the simultaneous acquisition of spectrally discrete images; however, image registration still remains a difficult problem. Every detector and its electrical readout circuitry have specific noise properties associated with the system. Thus, the use of different detectors means that each image will have different noise and gain properties making registration more difficult.

U.S. Pat. No. 4,650,321 discusses a multiple detector system where two detector arrays are used in combination with a dispersive imaging system. In this approach, an a focal telescope system is utilized with a concave reflective grating to form an image of the object on one detector. The image on the first detector corresponds to the undiffracted (zero order) beams. On the other detector, the first order diffracted beams are focused forming spectral images of each point on the object. If the points on the object are spaced close together, then the spectral images of each point will overlap and the spectral information will be lost. As a result, this system can only work properly if the 2-D scene being viewed consists of a small number of well-separated point sources, like stars, for example. This system will not function properly when viewing a standard 2-D scene.

To overcome the problems associated with multiple detector systems, attempts have been made to achieve the formation of multiple, spatially identical, but spectrally discrete images on a single film plane or detector array. U.S. Pat. No. 3,720,146 describes the use of four lenses arranged in a parallelogram configuration to simultaneously produce four images on a film plane. U.S. Pat. No. 5,479,015 also implements multiple focusing members to form a plurality of identical images on a single detector array. The use of a film plane has obvious disadvantages when compared to a detector array and the use of multiple lens systems introduces the same problems already discussed with respect to U.S. Pat. No. 4,134,683.

U.S. Pat. No. 4,141,625 discusses the use of two partially reflecting mirrors in combination with a single lens system to create two images of an object on a single detector array. Tilting these mirrors in both the x and y directions allows for the separation of the images at the detector plane. While this design achieves the objective of creating multiple identical images, the use of reflective mirrors leads to image inversion. One-dimensional imagery is fairly straightforward in this application. Two-dimensional imagery has some problems because the reflective mirrors are not specifically located in a pupil plane. As a result, each channel does not contain the same amount of energy and this difference is exaggerated as the field increases. In addition, vignetting (light loss, as well understood in the art) can be significant. This configuration also does not address any way to form images which have different spectral components because the mirrors are not spectrally selective. Finally, the reflective mirrors are situated such that the light incident upon them is diverging. This has the disadvantage of being radiometrically inefficient and a high level of background noise will be present on the detector because the mirrors are reflecting not only light from the object, but also background light through the lens. The combination of radiometric inefficiency and high noise leads to a reduction of the signal-to-noise ratio.

U.S. Pat. No. 4,272,684 attempts to address the problem of radiometric efficiency and even uses a reflective prism configuration to function as a beamsplitter. However, this configuration suffers from the same problems as the previous system, namely an inability to acquire more than two images, nonuniformity of the images, and an inability to acquire these two-dimensional images without incurring loss in throughput with field because the reflective prism is not located in a pupil plane. As with the previous system, this approach has no means for producing spectrally discrete images.

Filter wheel systems have also been used as a means of obtaining spectral images using a single detector (U.S. Pat. No. 5,587,784). In these systems, a standard imaging scheme is used to image a 2-D object onto a detector array. A filter wheel assembly is placed in the optical path such that one of the filters transmits a fixed set of wavelengths. If a different set of wavelengths is to be passed, the wheel is rotated and a different filter is placed in the optical path. By rotating the wheel, different spectral images are obtained. Thus, it is clear that simultaneous spectral images cannot be acquired with this approach.

U.S. Pat. No. 4,933,751 describes a tri-color separating system which uses four dichroic beamsplitters to form three separate color images right next to each other at an image plane. An immediate problem with this configuration is that the filters are not located in a collimated space. Since the filters are located in a space where the incident beams are converging cones of light, the spectral filtering of the light will not be constant over the cone. This effect is common in this configuration because the bandpass of a spectral filter is sensitive to the angle of incidence. As a result, true spectral discrimination for each point in the object is not possible.

U.S. Pat. No. 4,786,813 discloses a method for producing two-dimensional, spectrally discrete images on a single detector array which employs a segmented concave mirror. This segmented mirror has the dual function of separating the beams originating at the object and focusing the beams onto the detector to form the images. While this system achieves the desired objective, the properties of the design lead to poor optical performance in all but a handful of situations. Since the imaging system is only comprised of a single spherical mirror, aberrations reduce resolution and degrade imagery. This is not desirable, especially in microscopy applications. If any reasonable field of view is being imaged, spherical aberration is a problem along with coma, astigmatism and field curvature. Since the spherical mirror is tilted to form the images on the detector, all of the field aberrations also exist on-axis. Again, the location of the spectral filters presents a problem because they are located in a space where the incident beams are converging cones of light.

Finally, some prior-art systems attempt to perform multispectral, two-dimensional imaging on a single detector array without scanning, but each system again has serious limitations. U.S. Pat. No. 5,024,530 discusses a telecentric, filtered imager capable of producing only two spectral images of an object. This configuration has a number of disadvantages. First, the incident beams of light need to be filtered at two different planes of the lens system. Second, while the first filter plane is located in a telecentric space, it is not located in a collimated space. As a result, all the associated problems of having a non-collimated beam passing through an interference filter are prevalent. Third, while the second filter plane is in a collimated space, the filters are not removable, making filter substitution more difficult. Finally, the beam separation assembly consists of a triangular prism (i.e. two facets) used in transmission. That is, refraction of the incident light is the mechanism used for separating the beams, resulting in inherent problems since refraction is a wavelength dependent phenomena. Therefore, the beams will not only be separated spatially, but in each of the spatially separated beams there will be a spectral separation due to the optical dispersion of the prism. This optical dispersion will lead to a smearing effect at the detector plane reducing resolution, degrading imagery, and creating image registration problems.

U.S. Pat. No. 5,642,191 discusses a very similar approach and suffers from many of the same drawbacks. U.S. Pat. No. 5,526,119 avoids the limitation of two-band imaging with the use of multi-faceted prisms to obtain more images. However, since the prism is again used in transmission, all the problems related to optical dispersion associated with refraction remain. This system is even less flexible with respect to filter replacement because the spectral filters are described to be attached mechanically or through adhesion to or deposition on the prism itself. In addition, the manner in which the field stop is used leads to images on the detector which have dead space between them. The lack of contiguous multiple images does not allow for the use of the full resolution or field of view of the detector array which will be problematic in many applications.

Therefore, there is still a need for a multi-spectral two-dimensional imaging spectrometer that is capable of real-time imaging without scanning and/or computation. This invention is directed at providing an apparatus and a related spectrometric approach to fulfill that need.

BRIEF SUMMARY OF THE INVENTION

An objective of this invention is a spectrometer that is capable of two-dimensional, real-time imaging spectrometry, with sub-pixel registration of the images.

Another objective is a spectrometer that operates without the use of mechanical or electrical scanning.

Yet another goal is a spectrometric arrangement that does not require the use of application specific, computationally intensive, system matrices.

Finally, another goal is the implementation of the above mentioned objectives in a commercially viable system that maximizes the utilization of existing technology and results in economic, compact, commercially viable products.

Therefore, according to these and other objectives, the present invention consists of a combination of single or multi-element, achromatic, well-corrected lenses for imaging a two-dimensional scene on an internal field stop. The light emanating from this intermediate image is then collimated with another multi-element, achromatic, well-corrected lens. A spectral separation subassembly that divides the incident light into multiple, identical, and independent arms is placed in the collimated space following the collimating lens. The light in each arm is spectrally filtered based on the properties of an interference filter in each arm. Finally, an imaging subassembly composed of a single multi-element, achromatic, well-corrected lens system forms contiguous images onto a single two-dimensional detector array. The images are identical copies of the original object with each copy having a different spectral component and can be viewed on a standard monitor or alternatively on a computer employing an analog-to-digital conversion device.

Thus, the spectrometer produces simultaneous, spectrally discrete, two-dimensional images that can be acquired in real time. The system is capable of simultaneously forming two or more spectral images on a single detector plane with minimal image degradation caused by aberrations and with no optical dispersion due to the spectral separation assembly. Problems with image registration are minimized because each spectral channel propagates through a common set of optics eliminating boresight errors common to multiple channel systems. External mechanical adjustments in the spectral separation subassembly allow alignment capability of images to achieve registration to within one pixel. Thus, the device is extremely flexible and can be used with various camera mounts, camera lenses, and more complicated optical systems. In addition, the spectral filters are easily interchanged allowing spectral imaging over any wavelength region.

Various other purposes and advantages of the invention will become clear from its description in the specification that follows. Therefore, to the accomplishment of the objectives described above, this invention consists of the features hereinafter illustrated in the drawings and fully described in the detailed description of the preferred embodiment and particularly pointed out in the claims. However, such drawings and description disclose but some of the various ways in which the invention may be practiced.

DESCRIPTION OF THE PREFERRED EMBODIMENTS OF THE INVENTION

The heart of this invention lies in the improvements derived in a two-dimensional imaging spectrometer, wherein the image of an object is divided by a reflective prism and filtered into spectral components, by providing a pupil relaying optic for imaging the exit pupil of the preceding optics at a plane coincident with the apex of the prism; by providing an aperture stop at that same plane; and by imaging each spectral component on a detector through a single optical lens placed symmetrically on-axis.

In all figures used to illustrate this disclosure, the coordinates x and y are used to describe the plane orthogonal to the main optical axis of the spectrometer, x and y corresponding to the horizontal and vertical directions, respectively. The z coordinate corresponds to the direction along the optical axis of the device.

For the purposes of this disclosure, an optical filter is defined as any component, such a spectral or neutral-density filter or a polarizer, that modifies the optical characteristics of an incident wavefront. The optical state of a wavefront is defined as the combination of the wavefront's intensity, phase, polarization and wavelength.

Figure 1:
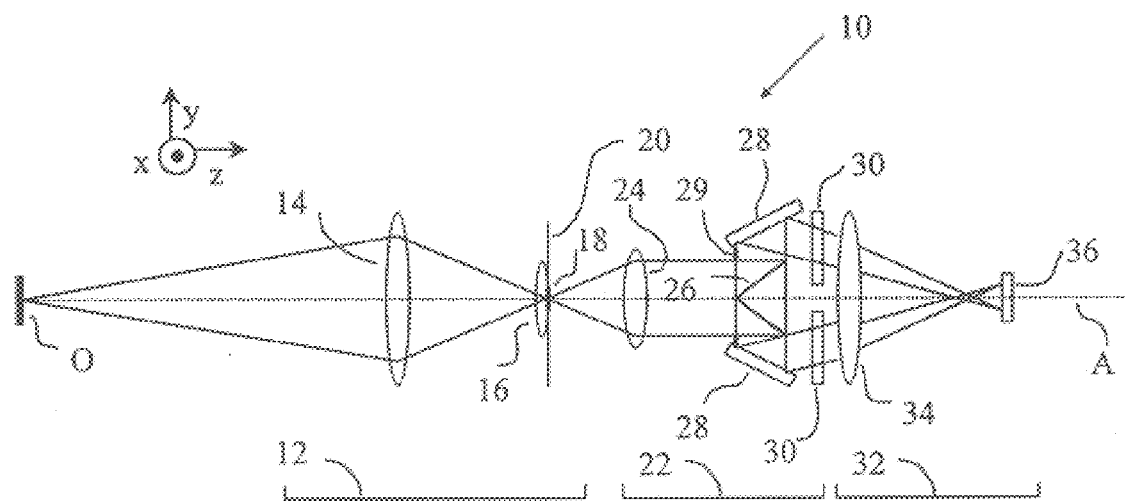
FIG. 1 is a schematic representation of the y–z cross-section of an imaging spectrometer according to the preferred embodiment of the invention consisting of a multifaceted reflecting component, a single lens re-imaging assembly and a single 2-D detector array.

Referring to the drawings, wherein like reference numerals refer to like parts throughout, FIG. 1 is a schematic view of a two-dimensional imaging spectrometer 10 according to the invention. The figure illustrates a y–z cross-section of the system, which is symmetrical about its optical axis A aligned with the x coordinate. As will become clearly understood from this disclosure, the degree of the symmetry depends upon the number of spectral-separation channels in the system, which in turn depends on the number of facets of the reflecting prism.

For clarity of description, the spectrometer 10 is characterized as consisting of three distinct functional subassemblies. An image-collection subassembly 12 is first provided to produce an intermediate two-dimensional image of a test object O within a field-stop aperture in the system. The image-collection subassembly 12 includes three distinct components. An achromatic, aberration corrected, possibly multi-element optic 14 and a single or multi-element optic 16 are used to produce a chromatically and spatially well-corrected intermediate image 18 of the object O in the same plane as an adjustable square/rectangular/circular field-stop aperture 20 (placed normal to the optical axis of the system). According to a novel aspect of the invention, the element 16 of the preferred embodiment is a pupil relaying optic to image a pupil plane at the location of the spectral separation component of the spectrometer, as described in detail below. The adjustable aperture 20 functions as a field stop rejecting stray and scattered light and serves to properly size the spectral images on a detector downstream. The aperture 20 is preferably made adjustable so that the system can be used with any size detector array. Without this field stop, the spectral images would overlap at the detector plane rendering the system useless.

The second group of components constitutes a spectral-separation subassembly 22 provided to separate the image 18 produced by the image-collection subassembly into its different spectral components. The spectral-separation subassembly 22 includes an achromatic, aberration-corrected, possibly multi-element optic 24, a multi-directional reflecting element 26, a group of flat, highly reflective surfaces 28 and an assembly 30 of removable spectral filters. The component 24 is an optic with a positive focal length that collimates the light coming from each point in the plane of the intermediate image 18. The light then strikes the multi-directional reflecting element 26 through an aperture stop 29 limiting the collimated space to an area no greater than the size of the reflecting element 26, so that no light passes past the element 26 without striking it. The element 26 is preferably a multi-faceted prism constructed such that its multiple sides are triangular and connect to form an apex. The prism 26 is oriented with its apex facing towards the incident light, coincident with the system's optical axis A, and in the same plane as the aperture-stop 29 and the exit pupil plane of the preceding optical system relayed by the optic 16. For the purpose of this disclosure, the exit pupil of the preceding optical system is defined as the exit pupil of the optical system comprising optics 14, 16 and 24, and/or any other optics that may be used to provide a pupil plane at the apex of prism 26. Each side of the prism 26 that connects to form the apex is coated to be highly reflective and forms a front-surface reflector. As illustrated in FIG. 1, each triangular side reflects a portion of the incoming light into a direction that is preferably orthogonal to the incident direction.

Alternatively, a truncated prism with equal quadrilateral sides could be used instead of prism 26 (that is, a prism truncated at a face parallel to the prism's base, herein defined as the top surface of the truncated prism). The truncated prism would similarly be oriented with its top surface facing towards the incident light, with the axis of the truncated prism coincident with the system's optical axis A, and preferably with the top surface in the same plane as the aperture-stop 29 and the exit pupil of the preceding optical system relayed by the optic 16, as defined above. In view of the functional equivalence of this alternative embodiment, the term prism, as used herein, is intended and hereby defined to refer to either a prism or a truncated prism.

Thus, the prism 26 acts as a beam division mechanism for the imaging spectrometer. Each separate beam reflected from the prism is then further reflected by a corresponding mirror 28 toward a predetermined area on a detector array and filtered by a corresponding optical filter in the filter assembly 30 adapted to transmit only a selected waveband. Each reflecting component 28 has external tip and tilt mechanical adjustments (not shown in the figures) for accurate placement of the images onto the detector. Once mechanical alignment is accomplished, image registration is automatic without the need for any image processing. In order to ensure that the original beam is divided equally, the prism must be positioned exactly coaxially with the optical axis, and its top surface/apex must be coincident with the plane of the aperture stop 29 (which is also the exit pupil plane) so that the energy incident on the reflective surfaces is divided equally among various channels for each field point.

According to another novel aspect of the invention, when the multi-spectral imaging system 10 is used by itself, the operating f/number of the optic 14 is selected to make the multi-faceted prism 26 the aperture stop of the system. When the multi-spectral imaging system is used in conjunction with another optical system (that is, without element 14 in the figures), the exit pupil of the external optical system has to be imaged at the location of the multi-faceted prism 26 in order to ensure even division of the incident light. This is the primary function of the optic 16. By choosing the appropriate focal length for this lens, the exit pupil of the external optical system is imaged at the location of apex/top surface of the multi-faceted prism 26 to ensure optimal operation of the system.

It is noted that the inclusion of the pupil relaying optic 16 in the system to place the pupil at the apex/top surface of the prism represents a significant improvement over the prior art because it provides for the equal distribution of the energy of the incident beam into the various channels of the optical system. In addition to achieving inter-image uniformity, forcing this location of the pupil at the prism (i.e., the location of the beam division) ensures that parallax errors are eliminated. This is extremely important in order to achieve sub-pixel registration of the various images produced by the spectrometer for downstream data processing, if necessary. Another important element of the design of the invention is the fact that the beam division is performed by way of reflection instead of refraction. Reflection, unlike refraction, is an achromatic process. That is, reflection has no wavelength dependence, so that splitting the light in this manner alleviates the optical dispersion problems associated with systems that use prisms in transmission to perform the beam division.

A re-imaging subassembly 32 utilizes independent and spectrally filtered beams to produce multiple, spatially identical, but spectrally discrete, images of the original object onto a single two-dimensional detector array. The re-imaging subassembly 32 comprises an imaging optic 34 and a detection system 36. The optic 34, which may be multi-element, is located past the removable filter assembly 30 and focuses the filtered light to form multiple discrete images on the detector array 36, with each image containing different spectral components. These images are then viewed on a monitor or recorded by a computer connected to the detector (not shown in the figures).

According to yet another aspect of the invention, the optic 34 consists of a single element placed symmetrically on-axis, such that its optical characteristics and defects/aberrations affect all channels equally. This allows for the use of a single detector 36, improves the quality of the images formed on the detector, and further facilitates the registration of the images for data storage and processing because each spectral image has identical optical properties and identical noise and gain properties.

Figure 2:
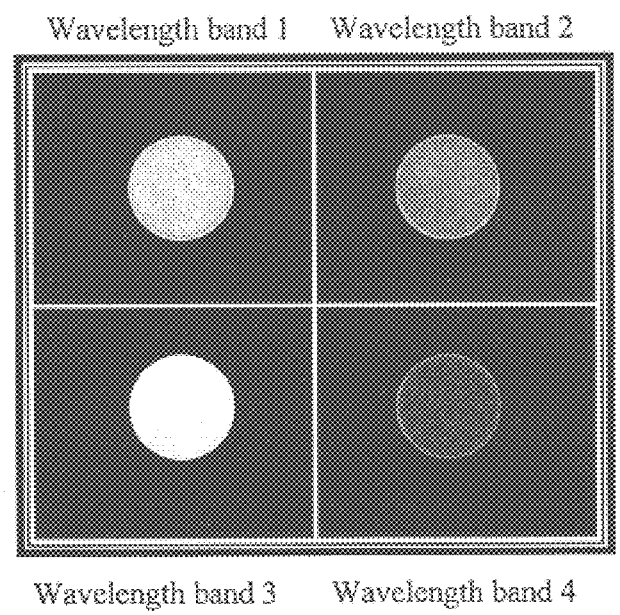
FIG. 2 is a multi-spectral image of a circular spot produced by the invention utilizing a four-facet reflecting component.

Supposing, for example, that the object O were a circle, its spectrum contained multiple wavelengths, and the prism 26 were pyramidal with four highly reflective sides, there would be four-fold symmetry about the optical axis of the instrument and the output from the detector array, as seen on the monitor, would appear as shown in FIG. 2. Thus, by splitting the light as described, the optical system of the invention features multiple, separate and independent arms. For example, if the multi-faceted prism 26 were provided with eight highly reflective sides (i.e., eight-fold symmetry), eight, separate and independent arms would result. In each of these arms, the system includes a flat, externally adjustable, highly reflective surface that steers each divided beam of light towards the removable filter assembly 30, which contains as many filters as there are independent arms. Each filter allows the transmission of different spectral components of the incoming light.

It is important to note that the entire spectral separation mechanism 30 is located in a collimated space such that all the light from a particular point in the plane of the intermediate image 18 sees the same wavelength bandpass in its respective spectral channel (i.e., there is no bandpass variation with numerical aperture). The removable filter assembly 30 is preferably designed to accommodate individual one-inch square or circular filters that can be easily interchanged allowing for the formation of spectral images corresponding to any desired bandpass.

Figure 3:
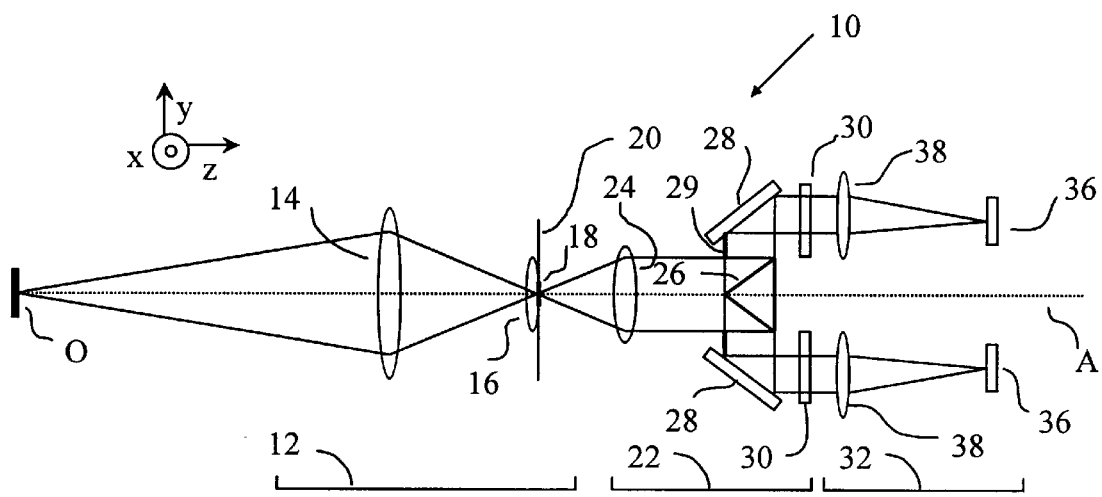
FIG. 3 is a schematic y–z cross-section representation of an alternative imaging spectrometer according to the invention consisting of a multi-faceted reflecting component, a multiple-lens re-imaging assembly and multiple 2-D detector arrays.

In an alternative embodiment of the invention shown in FIG. 3, the re-imaging subassembly 32 comprises multiple imaging lenses 38 focusing each arm onto a separate sensor 36, one for each of the spectral images produced by the spectrometer. While prior-art devices have utilized multiple imaging lenses and mirror assemblies to both divide the pupil and form the images on the detector, the approach has had a serious disadvantage in the fact that it is very difficult to properly correlate and register the images. This is due to boresight errors which result from the fact that the individual lenses cannot physically occupy the exact same location, so each lens sees the object at a different angle. Effectively, each lens sees a different object. To overcome this problem, the present invention utilizes a separate subassembly to perform the pupil division/spectral separation, so that misalignment of the focusing elements will not lead to boresight/parallax errors. This important distinction, in combination with the reflective spectral-separation subassembly 22, represents a significant advantage over existing technology.

It is noted that multi-faceted reflective prisms have been used before for other applications. A variety of configurations have been designed where the prism is used for beam division to place different portions of the field of view of an optical system onto different detectors (see, for example, U.S. Pat. Nos. 5,194,959 and 5,539,483. These are different applications than disclosed here. In order to split the field of view of a system, the beamsplitting assembly is necessarily not located at a pupil plane. In contrast, the subject of the present invention is the replication of the field of view of the optical system, not its division.

Multi-faceted prisms have also been employed in illumination systems so that one light source can be used to illuminate more than one object. U.S. Pat. No. 5,153,621 discusses such a configuration for placing the images of different objects adjacent to each other at an image plane. The prism/multiple lens assembly is simply being used to channel light into different arms to illuminate different objects. The prism is not specifically located in a pupil plane for the purpose of replicating images of the same object. Separate images of the source are not being formed at any image plane of the projection system. Instead, overlapping images of the source are being formed in the exit pupil of the projection system. In addition, the concept disclosed in U.S. Pat. No. 5,153,621 works only if specific segments of the clear aperture of each of multiple lenses can be used. A single whole lens cannot be used to achieve the same effect.

Figure 4:
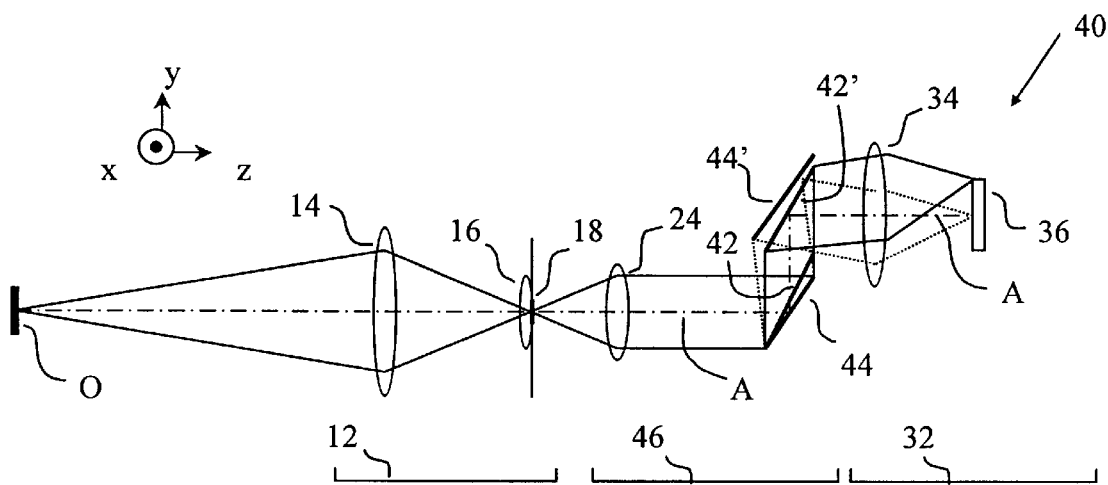
FIG. 4 is an imaging spectrometer according to another embodiment of the invention utilizing an interference filter spectral separation subassembly.

In another embodiment 40 of the present invention shown in FIG. 4, a different approach is used to produce the separation of the image 18 into its spectral components. Instead of using a pyramid-prism/optical-filter combination, the beam division and spectral filtering functions are combined by employing a set of interference filters 42 and a corresponding set of flat reflecting surfaces 44 in the collimated space between the optics 24 and 34. Reflection is still the main mechanism by which the beams are divided; however, interference filters are used as beamsplitters to split the beams in a spectrally selective manner. The main advantage of this configuration is that it is a more radiometrically efficient design than the first embodiment. However, the use of interference filters can make the system less compact; therefore, it is not preferred in most instances.

As well understood in the art, an interference filter generally consists of a multi-layer coating on a glass substrate. It is designed to reflect certain wavelengths of light while transmitting others. Specifically, the wavelengths that are transmitted and those that are reflected depend on a number of physical parameters including the admittance of the substrate, the admittance of the layers in the coating, and the number and thickness of the layers. The angle of the filter with respect to the incident radiation also affects the wavelengths that are transmitted and reflected. Depending on the polarization of the radiation, the bandpass of the filter will shift to longer or shorter wavelengths as the angle between the filter and the incoming radiation increases.

Thus, the spectral separation capability of the interference-filter subassembly 46 depends on the use of specially designed interference filters 42 and on the fact that the bandpass of each filter changes with the tilt angle of the filter. The operation of this subassembly can be understood by considering the light coming from a single point in the plane of the intermediate image 18, as shown in FIG. 4. The incident light, which is composed of a number of different wavelengths, is collimated by the optic 24. The collimated light strikes a first interference filter 42, which is tilted about the x-axis at a particular angle (nominally 45 degrees) with respect to the incoming light. This first filter 42 functions as a long-pass filter, reflecting shorter wavelengths and passing longer wavelengths, thereby splitting the light into two beams, each with different spectral components. Directly behind the first interference filter 42 is a reflective flat 44 tilted about the x-axis at a slightly greater angle than interference filter 42. The transmitted light strikes the flat reflecting surface 44 and is directed upward in the same fashion as the initially reflected light. This light passes through the interference filter 42 a second time essentially unaffected. For optimal performance, in this embodiment of the invention the pupil relaying optic 16 is adapted to image an exit pupil of preceding optics at a plane coincident with the plane of the focusing optic 34.

Thus, the first half of the spectral-separation subassembly 46 splits the input light into two spectrally different beams propagating toward a second interference filter 42'. The filter 42' is also tilted about the x-axis (nominally 45 degrees) and it has a different transmission curve. For simplicity of explanation, assume for example that the short wavelength beam that comes from the first filter consists of blue light and green light, while the long wavelength beam consists of orange light and red light. The transmission of the second filter 42' would then be selected such that the green light of the short wavelength beam and the orange light of the long wavelength beam are passed while the blue light of the short wavelength beam and the red light of the long wavelength beam are reflected. As with the interference filter 42, a flat reflecting surface 44' is located behind the interference filter 42'. This surface is tilted about the x-axis at a slightly greater angle than the interference filter 42'. It is also tilted about the y-axis to provide separation in the other direction (i.e. along the x-axis). The green and orange light passed by the interference filter 42' is reflected by the mirror 44' so that these beams are passed back through the second interference filter 42' towards a focusing optic 34.

Thus, four beams are produced having different spectral components propagating at different angles toward the re-imaging subassembly 32. The optic 34, which may be multi-element, focuses each beam onto the detector array 36, as in the first embodiment of the invention. Since the beams are propagating at different angles, by the time they reach the detector array each beam will be spatially separated. Obviously, this entire explanation can be extended to all the points at the intermediate image plane. Therefore, the initial image 18 is decomposed into four well-corrected, spatially-identical images; one being blue, one green, one orange, and one red (or consisting of four other spectral components, depending on the characteristics of the interference filters). The result, seen in FIG. 2, is the same as for the embodiment depicted in FIG. 1. Since FIG. 4 is a two-dimensional drawing, it only shows two beams and cannot depict their separation into four independent beams.

It is noted that the flat reflecting mirrors 44 and 44' described in this embodiment could alternatively be replaced with other interference filters to afford additional spectral filtering. Therefore, as in the embodiment of FIGS. 1 and 3, the interference filter version of the multi-spectral 2-D imaging spectrometer of the invention can also be used to acquire more than four spectral images. In the first two embodiments, more spectral images could be acquired by increasing the number of reflective facets of the prism 26 and by adding a corresponding number of flat reflective surfaces and filters. In the alternative embodiment of FIG. 4, more spectral images can be acquired by adding the appropriate number of interference filters with the desired transmission properties.

Figure 5:
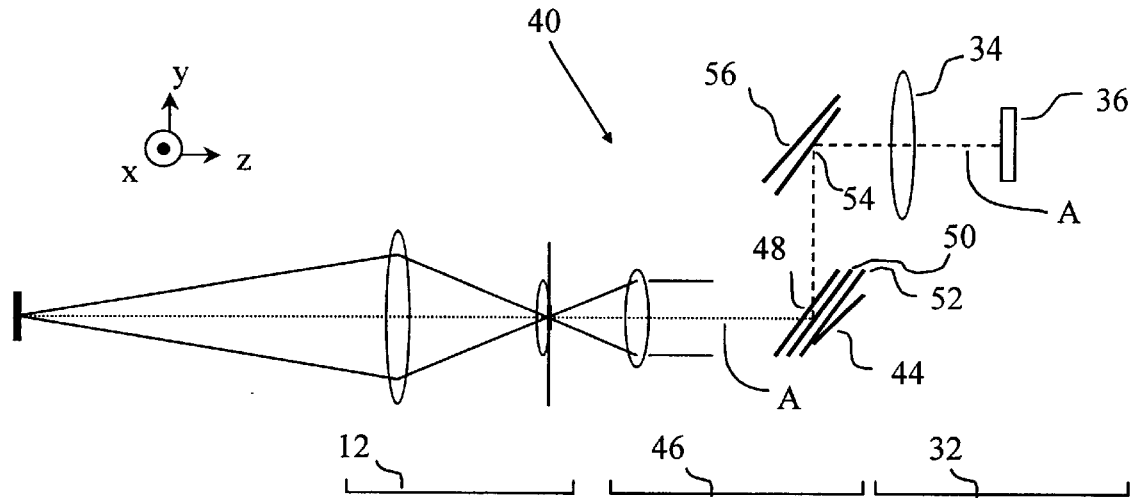
FIG. 5 is an imaging spectrometer with a multiple-interference filter spectral separation subassembly for obtaining more than four spectral images.
Figure 6:
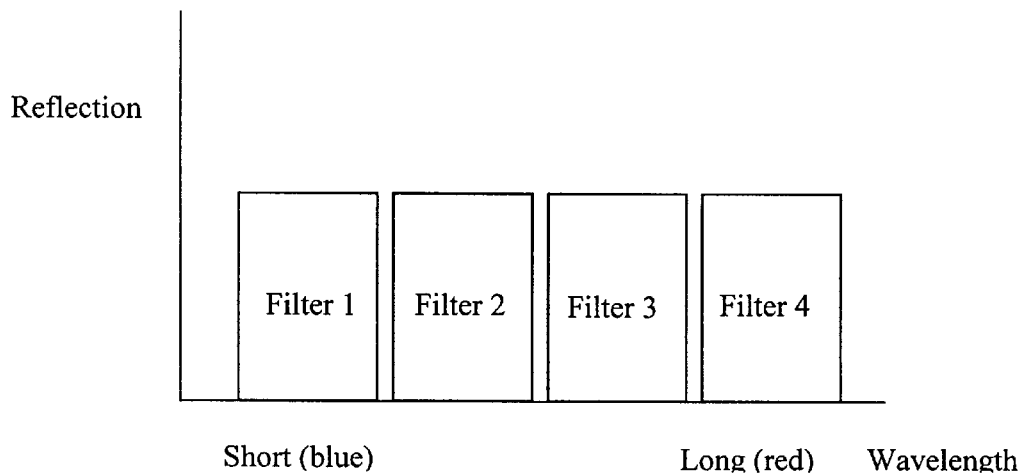
FIG. 6 is a qualitative depiction of the reflection bands of the first interference-filter component used in the embodiment of FIG. 5.
Figure 7:
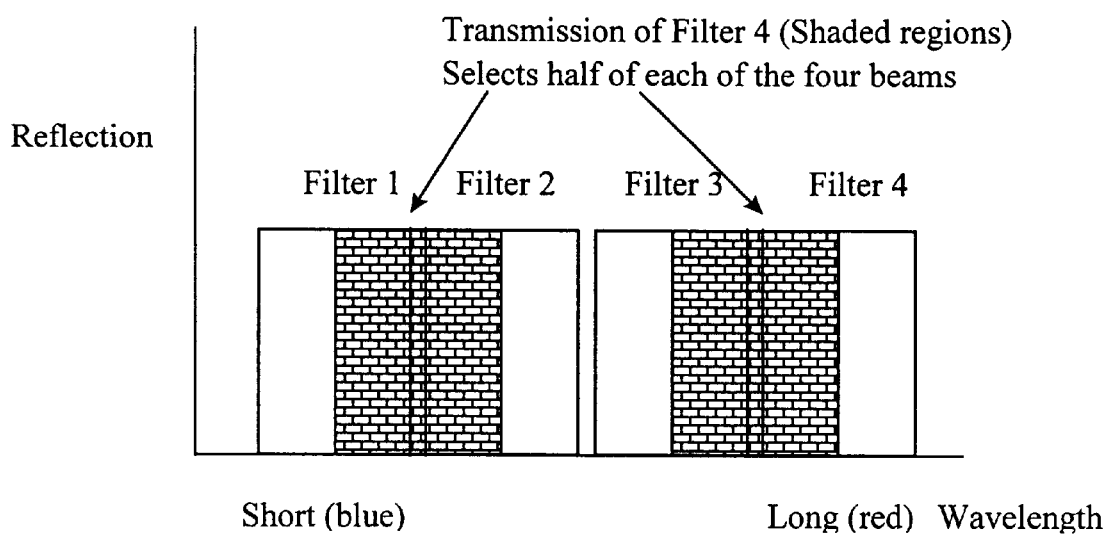
FIG. 7 is a qualitative depiction of the reflection bands of the second interference-filter component used in the embodiment of FIG. 5 overlaid on the reflection bands of first interference-filter component.
Figure 8:
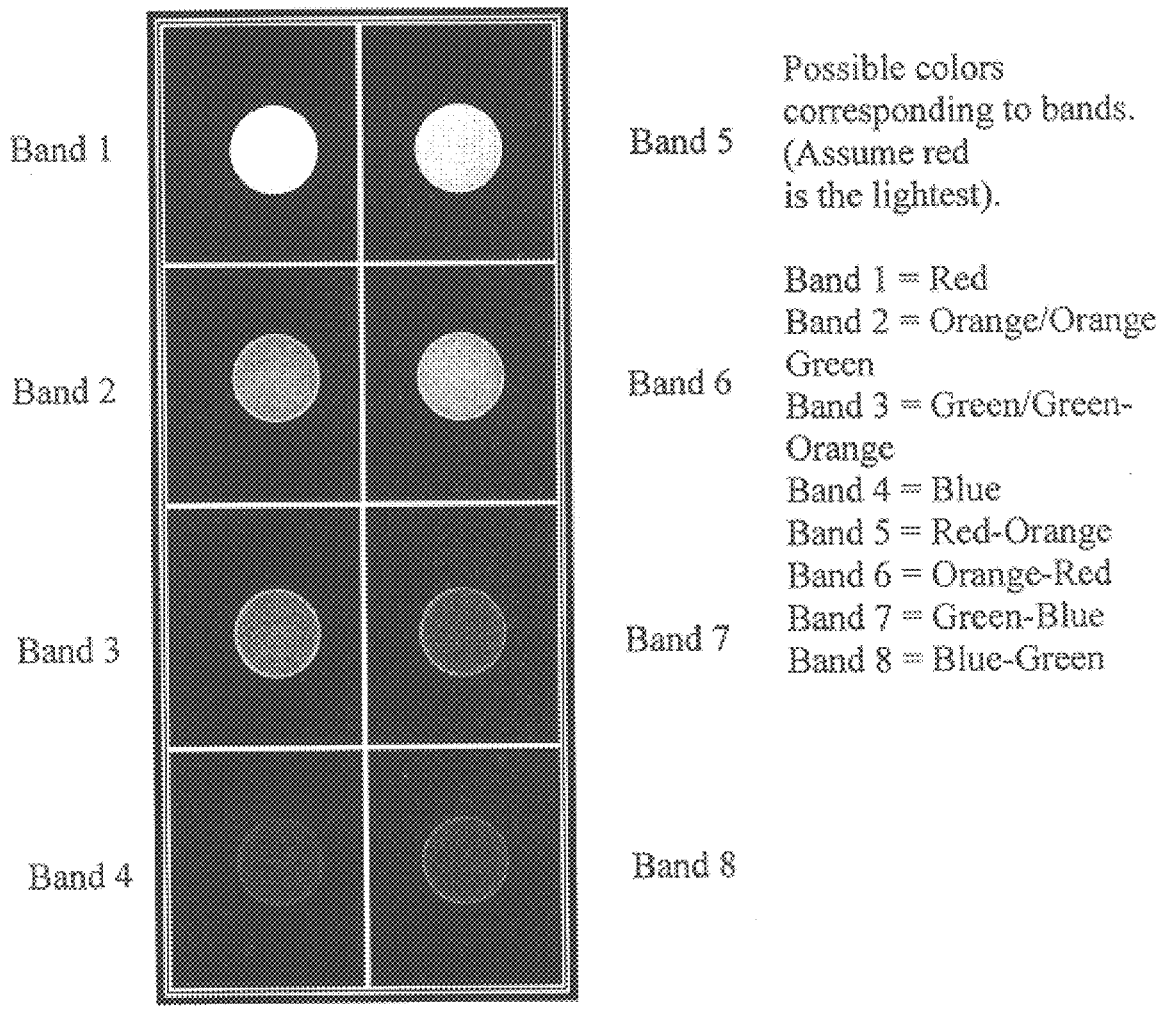
FIG. 8 is an illustration of the output of a detector of an imaging spectrometer with multiple interference filters.

For instance, the system illustrated in FIG. 5 shows three interference filters 48,50,52 in front of the first reflecting surface 44. As in the four-color example, these filters are tilted about the x-axis with each filter at a slightly different angle, so that the spectral images will be spatially separated at the detector 36. The reflection bandpass of each filter is illustrated qualitatively in FIG. 6. After this first train of three interference filters 48,50,52 and the flat reflecting surface 44, the initial beam has been split into four beams each having different spectral components of the original light and propagating toward a fourth interference filter 54. FIG. 7 illustrates the reflection bandpass of interference filter 54 overlaid on the bandpasses of interference filters 48,50, 52. All the wavelengths in the shaded blocks (4 blocks) are reflected by interference filter 54, and all the wavelengths in the unshaded blocks (4 blocks) are transmitted. The light transmitted by the filter is reflected by the flat reflecting surface 56 (which is tilted about x and y) past the interference filter 54, so that these beams are directed back and transmitted through the interference filter 54 towards the re-imaging subassembly 32. Thus, eight beams having different spectral components propagate at different angles toward the multi-element optic 34, which focuses each beam onto the detector array 36. Since the beams are propagating at different angles, by the time they reach the detector array each beam will be spatially separated. Therefore, the initial image is decomposed into eight well-corrected, spatially-identical images as shown in FIG. 8. Again, since FIG. 5 is a two-dimensional drawing, it does not depict the separation of the one initial beam into eight independent beams.

For this embodiment, the incorporation of a pupil relaying optic 16 is again a significant improvement over prior art for the same reasons mentioned with regards to the preferred embodiment. In the alternative embodiment, however, the pupil relaying optic 16 is used to image the exit pupil of the preceding optical system at the location of the final imaging lens 34. Specifically, by imaging the exit pupil of the preceding optics at this location, vignetting (light loss as a function of field) is significantly minimized, improving energy throughput and optimizing image registration.

For both the four-band and eight-band examples discussed above, the drawings show that there are two filter assemblies within the spectral separation subassembly. In the preferred embodiments of invention these filter assemblies consist of removable modules that allow an operator to easily set the desired bandpass of the spectral images. It is noted that in all embodiments the spectral separation is achieved without the use of any moving parts, thus alleviating any potential image registration problems. In addition, no algorithms are necessary for reconstructing the spectral images. Aside from the fact that no scanning is required, these designs have excellent radiometric throughput keeping the signal-to-noise ratio high. All embodiments are compact designs that make the imaging spectrometer system portable, allowing the device to be also easily used in field experiments. Thus, the applications for the system of the invention are numerous and varied, including industrial and agricultural inspection, weather detection, and weapons testing. For example, the device can be used to display two-dimensional temperature maps of an object in real-time. This is very useful in some industries for on-line process control during manufacturing. The imaging spectrometer can also be used for feature extraction and classification tasks such as automated pattern recognition, image enhancement, and scene analysis.

Various changes in the details, steps and components that have been described may be made by those skilled in the art within the principles and scope of the invention herein illustrated. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope embraced by any and all equivalent processes and products.

I claim:

1. A multi-spectral two-dimensional imaging spectrometer comprising:

means for producing an intermediate image of an object along an optical axis at a plane substantially coincident with a field-stop aperture of the spectrometer;

means for dividing incident light from said intermediate image into multiple light channels;

means for modifying each channel to produce a predetermined optical state of the intermediate image; and means for imaging each channel on a detector, thereby producing multiple two-dimensional images of the intermediate image;

wherein said means for producing an intermediate image of an object includes a pupil relaying optic for imaging an exit pupil of preceding optics at a predetermined exit pupil plane along said optical axis, said plane being selected such as to minimize vignetting.

2. The spectrometer of claim 1, wherein said means for dividing incident light from said intermediate image into multiple light channels comprises a multi-faceted reflective prism disposed symmetrically along said optical axis and having a top surface or apex facing said incident light and substantially coincident with said exit pupil plane of preceding optics.

3. The spectrometer of claim 2, wherein said means for modifying each channel comprises a reflective surface directing each channel toward said means for imaging each channel on a detector.

4. The spectrometer of claim 3, wherein said means for modifying each channel further comprises an optical filter in each channel toward said means for imaging each channel on a detector.

5. The spectrometer of claim 2, further comprising an aperture stop placed substantially at said exit pupil plane of preceding optics.

6. The spectrometer of claim 4, further comprising an aperture stop placed substantially at said exit pupil plane of preceding optics.

7. The spectrometer of claim 1, wherein said means for imaging each channel on a detector consists of a single optical means placed symmetrically on-axis.

8. The spectrometer of claim 2, wherein said means for imaging each channel on a detector consists of a single optical means placed symmetrically on-axis.

9. The spectrometer of claim 4, wherein said means for imaging each channel on a detector consists of a single optical means placed symmetrically on-axis.

10. The spectrometer of claim 1, wherein said means for dividing incident light from said intermediate image into multiple light channels and said means for modifying each channel include a pair of dispersive assemblies, each assembly including at least one interference filter and one reflective surface disposed at different angles with respect to said optical axis such that said incident light is partially reflected and partially transmitted by each interference filter according to predetermined selected wavebands to produce said multiple light channels directed toward said means for imaging each channel on a detector.

11. The spectrometer of claim 10, wherein said exit pupil plane of preceding optics is substantially coincident with said means for imaging each channel on a detector.

12. The spectrometer of claim 10, wherein said means for imaging each channel on a detector consists of a single optical means placed symmetrically on-axis.

13. A multi-spectral two-dimensional imaging spectrometer comprising:

means for producing an intermediate image of an object along an optical axis at a plane substantially coincident with a field-stop aperture of the spectrometer;

means for dividing incident light from said intermediate image into multiple light channels;

means for modifying each channel to produce a predetermined optical state of the intermediate image; and means for imaging each channel on a detector, thereby producing multiple two-dimensional images of the intermediate image;

wherein said means for dividing incident light from the intermediate image into multiple light channels is positioned along said optical axis within a collimated space and substantially coincident with an exit pupil plane of preceding optics.

14. The spectrometer of claim 13, wherein said means for dividing incident light from said intermediate image into multiple light channels comprises a multi-faceted reflective prism disposed symmetrically along said optical axis and having a top surface or apex facing said incident light.

15. The spectrometer of claim 13, wherein said means for modifying each channel comprises a reflective surface directing each channel toward said means for imaging each channel on a detector.

16. The spectrometer of claim 15, wherein said means for modifying each channel further comprises an optical filter in each channel toward said means for imaging each channel on a detector.

17. The spectrometer of claim 13, further comprising an aperture stop placed substantially at said exit pupil plane of preceding optics.

18. The spectrometer of claim 13, wherein said means for imaging each channel on a detector consists of a single optical means placed symmetrically on-axis.

19. A multi-spectral two-dimensional imaging spectrometer comprising:

means for producing an intermediate image of an object along an optical axis at a plane substantially coincident with a field-stop aperture of the spectrometer;

means for dividing incident light from said intermediate image into multiple light channels;

means for providing an aperture stop at a plane in a collimated space along said optical axis, said plane being substantially coincident with said means for dividing incident light from said intermediate image;

means for modifying each channel to produce a predetermined optical state of the intermediate image; and means for imaging each channel on a detector, thereby producing multiple two-dimensional images of the intermediate image.

20. The spectrometer of claim 19, wherein said means for dividing incident light from said intermediate image into multiple light channels comprises a multi-faceted reflective prism disposed symmetrically along said optical axis and having a top surface or an apex facing said incident light and substantially coincident with said aperture stop plane; and wherein said means for modifying each channel comprises reflective surfaces directing each of said multiple light channels toward said means for imaging each channel on a detector.

21. A multi-spectral two-dimensional imaging spectrometer comprising:

means for producing an intermediate image of an object along an optical axis at a plane substantially coincident with a field-stop aperture of the spectrometer;

means for dividing incident light from said intermediate image into multiple light channels;

means for modifying each channel to produce a predetermined optical state of the intermediate image; and means for imaging each channel on a detector, thereby producing multiple two-dimensional images of the intermediate image;

wherein said means for imaging each channel on a detector consists of a single optical means placed symmetrically on-axis.

22. The spectrometer of claim 21, wherein said means for dividing incident light from said intermediate image into multiple light channels comprises a multi-faceted reflective prism disposed symmetrically along said optical axis and having a top surface or an apex facing said incident light, and said means for modifying each channel comprises a reflective surface directing each of said multiple light channels toward said means for imaging each channel on a detector.

* * * * *